Figure 1:
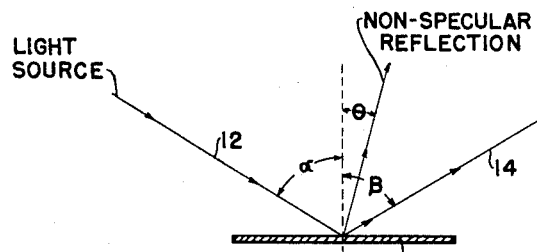

Aug. 2, 1960  R. C. WOODS  2,947,212
METHOD OF DETECTING SURFACE CONDITIONS OF SHEET METAL
Filed April 30, 1956

INVENTOR
ROBERT C. WOODS
BY
Pennie, Edmonds, Morton, Barrows & Taylor
ATTORNEYS

United States Patent Office 2,947,212
Patented Aug. 2, 1960

2,947,212

METHOD OF DETECTING SURFACE CONDITIONS OF SHEET METAL

Robert C. Woods, Old Lyme, Conn., assignor to The American Brass Company, Waterbury, Conn., a corporation of Connecticut Filed Apr. 30, 1956, Ser. No. 581,435

4 Claims. (Cl. 88—14)

This invention relates to the detection and/or measurement of certain conditions, such as defects, flaws, blemishes or any other marks, upon the surface of a sheet, web or foil of metal, cloth, paper etc. The condition may result from the process of manufacture or may be the result of subsequent treatment, handling etc. The invention is particularly applicable to the detection and/or measurement of surface lines, striations, threads or other markings existing in more or less parallel lines, whether caused inadvertently or deliberately, and whether desirable or undesirable. The aim of the invention is to provide an improved method of and apparatus for detecting and/or measuring interruptions or discontinuities of such generally parallel surface lines upon any sheet material. The invention is of particular advantage in detecting flaws in rolled sheet metal where the surface marking consists of generally parallel lines formed by grinding marks on the rolls, and which is capable of reflecting light and producing some non-specular reflection.

In the usual practical applications of the invention to the inspection of sheet or strip metal, the material whose surface is to be examined is fabricated as by passing through rolls, which produce surface markings in the form of parallel lines. For example, the rolls used to reduce the thickness of brass, copper, steel, or aluminum sheet or strip commonly have a ground surface, the pattern of which is impressed in the surface of the rolled metal to form thereon a series of parallel lines. Upon microscopic examination, these line markings are found to be grooves or valleys with very steep side walls.

In accordance with the invention, a light source is directed toward the surface of the material to be examined in a direction generally perpendicular to the line markings. Non-specular reflection in a selected direction which is perpendicular to the lines, and which is preferably between the angle of incidence and the angle of specular reflection, is monitored by photosensitive means which is able to detect a surface flaw by variation in the intensity of the reflected light. The light in the incident beam may be polarized and the light in the selected non-specular reflected beam filtered to pass only such polarized light.

The apparatus employed for practicing the method of this invention may vary, but always includes a light source to provide the incident beam and a photosensitive device, such as a photoelectric cell, positioned in the selected path of non-specular reflection. The apparatus advantageously includes a polarizing element arranged in the path of the incident beam and a lens for concentrating the beam. A lens may also be included for concentrating the effective reflection and a polarizing filter element may be interposed in the selected path of non-specular reflection and positioned to filter out all but the polarized light.

The invention is particularly useful for detecting surface flaws in sheet material moving in the direction of the surface markings, and the apparatus of the invention may be positioned directly on a rolling mill or other machinery for moving the material to be examined, or it may be otherwise mounted. A plurality of such apparatus may be used, as needed, to cover the full width of the sheet. Despite the simplicity of the method and the simple and inexpensive apparatus required, the results obtained are of a high order of accuracy. Moreover, the invention has wide applicability for examining materials having surface line marks generally parallel to one another, whether the marks are produced by rolling or otherwise and whether the lines are scratches, striations, threads, or other types of markings.

The foregoing and other novel features of the invention will be better understood from the following description taken in conjunction with the accompanying drawing, in which—

Figure 2:
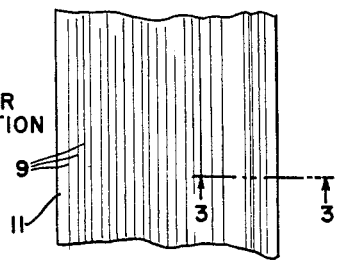
Figure 3:
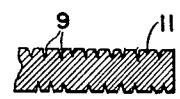
Figure 5:
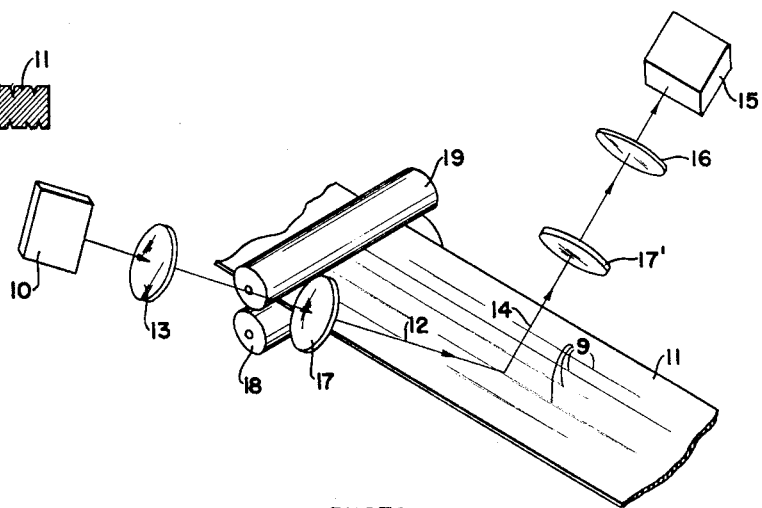
Figure 4:
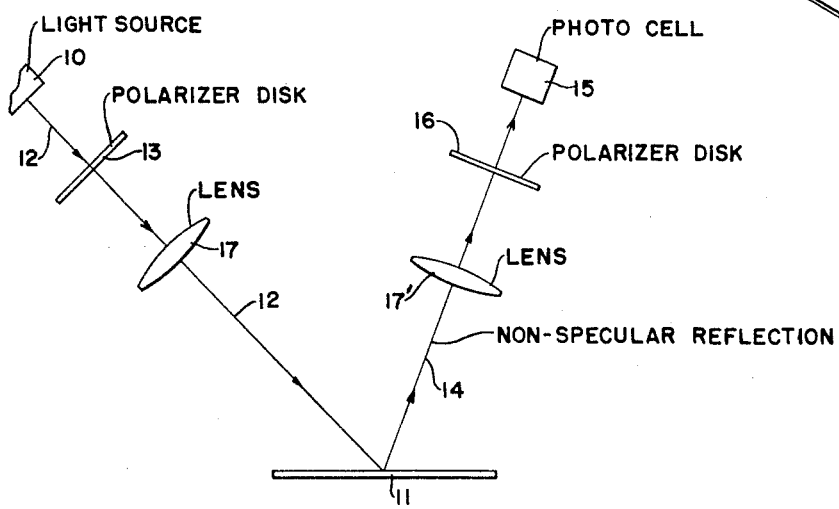

Fig. 1 is a section of a sheet of metal, schematically showing the way in which light normally tends to be reflected from the surface, Fig. 2 is a top plan of a metal strip showing the surface line markings, Fig. 3 is a section on the line 3—3 of Fig. 2 showing the nature of the line markings on the surface of the strip, Fig. 4 diagrammatically illustrates the principles of the invention, and Fig. 5 is a diagrammatic perspective view showing an apparatus of the invention operatively positioned on a rolling mill.

Light is normally reflected, as schematically illustrated in Fig. 1, so that the angle of incidence $\alpha$ is equal to the angle of reflection $\beta$, the condition which obtains in specular or mirror reflection. Any reflection not at the angle of reflection $\beta$ is non-specular and is ordinarily not as intense as specular reflection. In Fig. 1, the angle $\theta$ of non-specular reflection was selected arbitrarily and could have been selected as any angle other than $\beta$, but for the purposes of the present invention, the non-specular reflection will preferably be selected at some angle $\theta$ between the angle of incidence and the angle of reflection.

One type of material, shown in Figs. 2 and 3, having a surface suitable for investigation using the present invention is metallic sheet which has generally parallel valley-like marks or lines 9 in its surface. In the usual case, these lines are impressions due to imperfections in the surfaces of the roll of the rolling mill through which the sheet, or other stock, passes to reduce its thickness. These valley-like marks often have relatively steep side walls, as shown in Fig. 3, which extend in the direction of the rolling. Accordingly, when a beam of light is oriented transverse to the sheet and generally perpendicular to the lines, as shown in Fig. 1, there will be considerable non-specular reflection due to the effect of reflection from the side walls of the valley-like lines. The amount of non-specular reflection will vary as the angle $\theta$ is changed, and in a preferred embodiment of the invention an angle at which a desired amount of reflection occurs may be selected to provide sufficient non-specular reflection of light to permit comparison of its intensity over different parts of the surface of the material. As sheet in a rolling mill, for example, passes beneath the light source, the light reflected in the selected non-specular direction will be approximately constant until some discontinuity occurs which will absorb light and/or cause more or less light to be reflected in the selected non-specular direction.

In accordance with the invention, the light source employed to direct the beam of light toward the surface to be examined may be of any color, or any combination of colors, which it is convenient to use. The beam is preferably polarized exactly parallel to the lines on the sample. As shown in Figs. 4 and 5, a light source 10 is directed along a beam path 12 toward the surface of a material 11 to be examined through a polarizing disk 13 which is arranged to polarize the light parallel to the lines on the surface of the material 11.

Generally the reflection from most reflecting surfaces is specular so that, although it is theoretically possible to detect a flaw by a change in specular reflection, any change in the total specular reflection is relatively small compared with the total reflection so that a device examining only specular reflection would have to be very sensitive. However, non-specular reflection, which may also be thought of as specular reflection from the line markings, taken at any fixed selected angle θ along a beam path 14 to a photo-electric cell 15 is initially relatively quite small and will tend to vary considerably even with minute surface changes. The apparatus of the invention, advantageously, is made even more sensitive by placing a polarizing member such as a polarizing disk 16 in the beam path 14 before the photoelectric cell 15 to act as a filter where the incident beam has been polarized. If the incident and reflected light are polarized only the intensity of the polarized light is considered and all extraneous light rays are eliminated.

A condensing lens 17 may advantageously be included in the path of the light beam 12 between the polarizing disk 13 and the material 11 being examined, in order to concentrate the light beam. Similarly, a condensing lens 17′ may be included in the path of the selected non-specular reflected beam 14 between the material and the disk 16. The lens 17 has the effect of concentrating the light upon a smaller surface area for more intense lighting of that area, whereas the lens 17′ tends to concentrate the reflected light which is to irradiate the photosensitive detection means.

The material 11 may be a continuous sheet or strip moving parallel to the line markings during its examination, as shown, for example, in Fig. 5, where the apparatus is mounted on a rolling mill. Only the rolls 18 and 19, either or both of which may be driven, are shown, but it will be understood that the method and apparatus of the invention may be applied to a rolling mill no matter how simple or complex, and the frame of the mill may serve to support the apparatus. On the other hand, the apparatus may be so mounted that the light source and its related appurtenances are movable in order to obtain over-all examination of a stationary material.

The output of the photosensitive means may be applied to an indicating or recording means or to a means of automatic control. In this connection, optical means may be employed for direct visual observance of change of light intensity at the selected angle of non-specular reflection. However, in the usual situation, a photosensitive detection device, such as a photoelectric cell or a pick-up electronic tube, is employed. Where such an electronic device is employed, it is normally necessary to amplify the output signal of the device and the amplifier's output may, in turn, be used to energize any appropriate instrumentality for visual reading, such as a meter or an oscilloscope, or it may be applied to control means which, for example, may shut down the mill, or it may cause the material to be marked in some way so that the defect (or the like) may be more visually detected, etc. With optical indicating means, the observer acts in accordance with predetermined standards to indicate, or eliminate, the portion of the material which is defective. Automatic control is generally preferred, and may be supplied, for example, simply by the use of a switching device which operates to stop the mill when the intensity varies from a mean by a predetermined amount as indicated by the output signal of the photoelectric tube. The details of such control means are no part of the present invention and, furthermore, will be obvious to those skilled in the art. Moreover, the invention may serve to initate the actuation of many different types of control devices.

I claim:

1. A process for examining the surface of rolled sheet metal having parallel linear striations impressed thereon during rolling for the purpose of detecting defects in said surface which comprises directing an incident light beam of substantially constant intensity obliquely toward the surface to be examined in a direction generally perpendicular to said striations, moving the metal relative to the incident light beam substantially in the direction of said striations, and measuring the intensity of the reflection of said incident light beam from the walls of said striations, said measured reflection being the specular reflection of the incident light beam at a substantially constant angle from the side walls of said linear striations in a direction generally perpendicular to the linear striations between the incident light beam and its specular reflection relative to the plane of the sheet metal, whereby interruptions in the uniformity of the pattern of striations in the surface of the metal are revealed by variations in the intensity of said measured reflection.

2. A process for examining the surface of rolled sheet metal having parallel linear striations impressed thereon during rolling for the purpose of detecting defects in said surface which comprises directing an incident light beam of substantially constant intensity obliquely toward the surface to be examined in a direction generally perpendicular to said striations, polarizing the incident light beam in a plane that is substantially parallel to said striations, passing the reflection of said incident light from the walls of said striations through a polarizing filter by which light not polarized in a plane parallel to said striations is filtered out, the light passing said filter being the residual specular reflection of the incident polarized beam at a substantially constant angle from the side walls of said striations in a direction generally perpendicular to the striations between the incident light beam and its specular reflection relative to the plane of the sheet metal, and measuring the intensity of the light beam passing said filter, whereby interruptions in the uniformity of the pattern of the striations in the surface of the sheet metal are revealed by a substantial variation in the intensity of the measured light beam.

3. A process for continuously examining the surface of rolled sheet metal having parallel linear striations impressed thereon during rolling for the purpose of detecting defects in said surface which comprises directing an incident light beam of substantially constant intensity through a condensing lens obliquely toward the surface to be examined in a direction generally perpendicular to said striations, substantially continuously moving the metal relative to said incident light beam substantially in the direction of said striations, and substantially continuously measuring the intensity of the reflection of the incident light beam from the walls of said striations, said measured reflection being the specular reflection of the incident light beam at a substantially constant angle from the side walls of said linear striations in a direction generally perpendicular to the linear striations between the incident light beam and its specular reflection relative to the plane of the sheet metal, whereby flaws in the surface of the sheet metal are revealed by substantial variations in the intensity of the measured reflection as said sheet metal advances.

4. A process for continuously examining the surface of rolled sheet metal having parallel linear striations impressed thereon during rolling for the purpose of detecting defects in said surface which comprises directing an incident light beam of substantially constant intensity through a condensing lens obliquely toward the surface to be examined in a direction generally perpendicular to said striations, polarizing the incident light beam in a plane that is substantially parallel to said striations, passing the reflection of said incident light from the walls of said striations through a polarizing filter by which light not polarized in a plane parallel to said striations is filtered out, the light passing said filter being the residual specular reflection of the incident polarized beam at a substantially constant angle from the side walls of said striations in a direction generally perpendicular to the striations between the incident light beam and its specular reflection relative to the plane of the sheet metal, substantially continuously moving the metal relative to said incident light beam substantially in the direction of said striations, and substantially continuously measuring the intensity of the light beam passing said filter, whereby interruptions in the uniformity of the pattern of the striations in the surface of the sheet metal are revealed by substantial variations in the intensity of the measured light beam as the metal advances.

References Cited in the file of this patent

UNITED STATES PATENTS

| | | |
|---|---|---|
| 2,032,128 | Horsfield | Feb. 25, 1936 |
| 2,256,102 | Reason | Sept. 16, 1941 |
| 2,332,308 | Dresser | Oct. 19, 1943 |
| 2,604,809 | Mitchell | July 29, 1952 |
| 2,803,161 | Summerhayes | Aug. 20, 1957 |

FOREIGN PATENTS

| | | |
|---|---|---|
| 722,746 | Germany | July 20, 1942 |